Aug. 7, 1945.   R. V. BAKER   2,381,199
VEHICLE JACK
Filed April 26, 1944
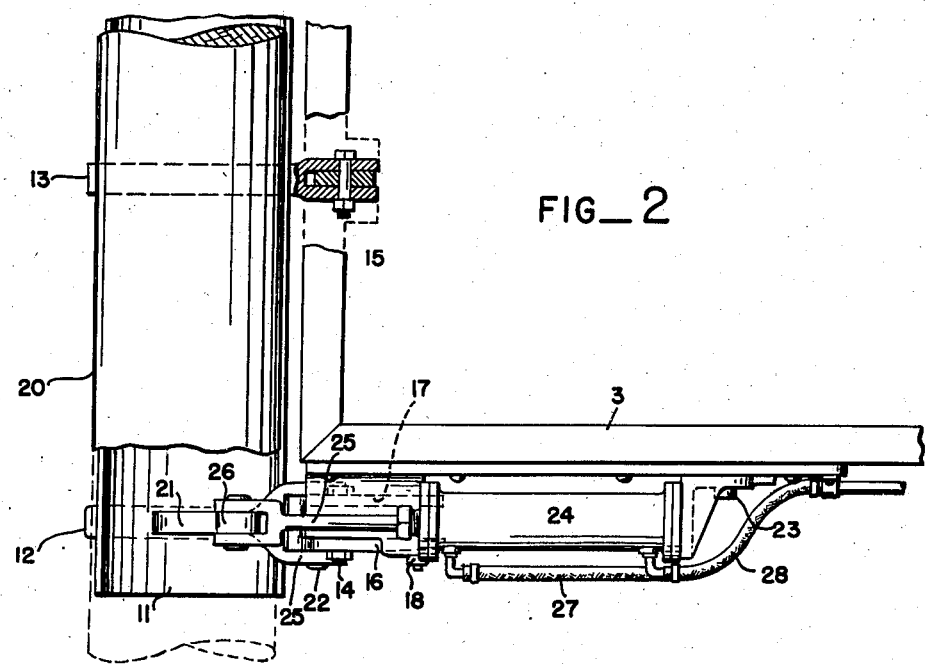
FIG_2
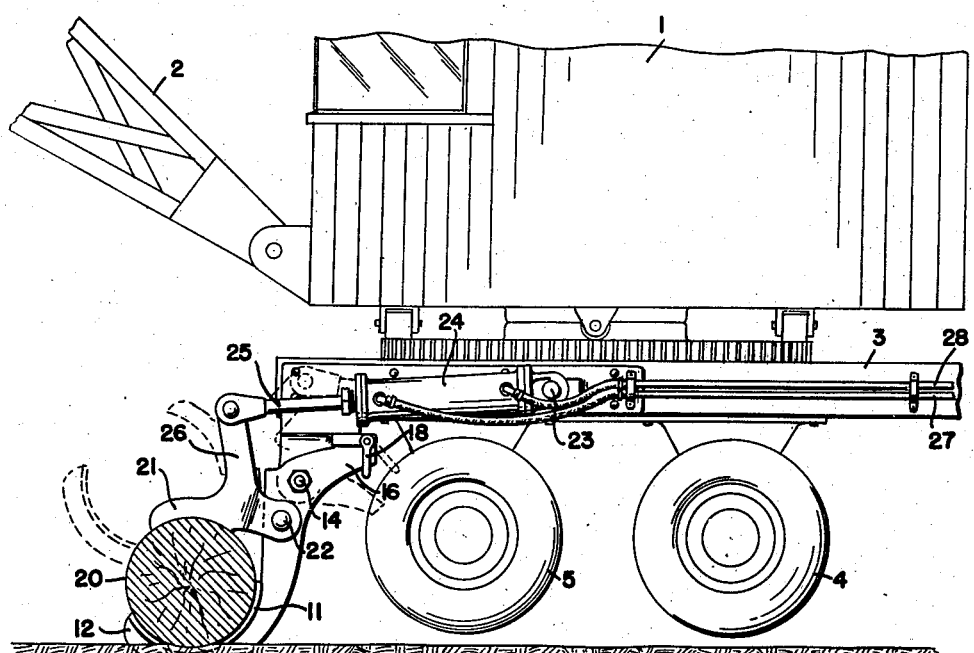
FIG_1
INVENTOR.
RHEA V. BAKER
BY
*Smith & Tuck*
ATTYS.

Patented Aug. 7, 1945

2,381,199

UNITED STATES PATENT OFFICE 2,381,199

VEHICLE JACK

Rhea V. Baker, Seattle, Wash., assignor to Feenaughty Machinery Co., Portland, Oreg., a corporation of Oregon Application April 26, 1944, Serial No. 532,727

5 Claims. (Cl. 212—145)

The present invention relates to a vehicle jack and, in more particular, to a jack and tail supporting device.

In the operation of certain vehicles, such as mobile cranes and other similar devices, a constant source of trouble is that of providing a firm foundation upon which the vehicle or device may operate rather than upon the wheels or tires used in the transportation or movement of the vehicle. In the prior art numerous hand and power driven jacks have been provided in an effort to quickly and easily stabilize such vehicles when in operating position, but none are fully satisfactory.

Having in mind the defects of the prior art, it is an object of the present invention to provide a jacking means which is power driven and which may be quickly and easily operated to give the vehicle a broad and firm supplemental base.

A further object of the present invention is the provision of a power operated jacking device which will quickly and efficiently raise the vehicle wheels off the ground.

Yet another object of the present invention is the provision of a jacking device which may ordinarily be operated to quickly raise the vehicle off the ground and into which may be incorporated a long and large timber or similar beam which will greatly increase the base width of the vehicle when its frame is elevated.

The above defects of the prior art are remedied and these objects attained by means of a device having a ground engaging pan with arms pivoted to the frame of the vehicle. A clamping jaw which comes down upon a log or timber placed on the pan clamps such a member in the pan. By forcing the log and pan downwardly the vehicle is raised off its wheels and the pan and its arms come against a stop whereby the vehicle will be rigidly held in the elevated position. The jaw may be actuated by a conventional hydraulic cylinder and piston.

A device constructed in accordance with the above outline and capable of achieving the above objects is shown in the accompanying drawing, in which:

Figure 1 is a side view, partly in section, of a vehicle having embodied therein the present invention; and Figure 2 is a fragmentary plan view of the device shown in Figure 1 with parts of the device and vehicle cut away.

In Figure 1 there is shown a vehicle having mounted thereon a rotatable crane house 1 having attached thereto a crane 2. The crane and house are mounted on the vehicle frame or bed 3 which is normally supported on wheels 4 and 5. In many of these movable cranes there are no springs between the wheels and the frame or bed of the vehicle, the wheels being fixedly supported with respect to the rest of the vehicle.

The present invention may be applied to both or only one end of the vehicle. In the present illustration there is shown only one end of the vehicle with the present invention applied thereto. Also, in the present showing only half of the device or mechanism is shown in the plan view.

In these views there is shown an apron 11 made and from side to side of the vehicle. This apron or pan is supported on cranks 12 and 13 that are in the form of a channel which extends across disposed across the end of the machine. The cranks are pivoted on pins 14, 15 that are carried by the frame of the vehicle. The crank 12 at its upper end is forked and extended beyond the pivot 14 to form the fork legs 16, 17. The ends of the fork are retained by safety loop 18 which swings from a portion of the frame and serves as a stop or lock for preventing upward movement of the pan carrying crank 12 should the cylinder 25 be relieved of pressure. A similar crank is arranged on the other end of the pan and carried by the other end corner of the vehicle.

The pan extending across the end of the vehicle is adapted to carry log 20 which is normally longer than the vehicle width. This log is held down upon the pan by the jaws of an upper crank 21 that is pivoted by means of a pin 22 to the upper portion of the lower crank 12.

Secured to the frame 3 of the vehicle by pin 23 so that it may swing thereabout is an oil jack or cylinder 24 whose piston rod 25 is connected to the upper jaw 21 by means of the integral extension 26. The jack cylinder 24 is connected with a suitable source of oil or other fluid under pressure through the supply line 27, 28.

It is to be understood that each end of the vehicle is supplied with units such as shown in Figures 1 and 2. These units are positioned on the corners of the truck, so that both ends of the timber 20 will be securely held in place. It is also desirable in most installations that a similar device be provided at each end of the vehicle, so that the crane may rotate in any direction and pick up loads from any direction.

It is to be noted that the rear portion of the jaw 21 is forked to fit around the upper portion of the crank 12 and to be pinned thereto by a pin 22. It will also be observed that this fork and the upstanding portion 26 limits the motion of the jaw 21 relative the crank 12 in either direction, as continued motion in either direction will bring the base of the fork against the crank 12.

In the operation of the present device when the cylinder is actuated to retract the rod 25 the jaw 21 will rise and the base of the fork will contact the crank 12 to lower the vehicle, to lift the jaw and pan off the ground, and to allow the wheels 4, 5 of the vehicle to rest on the ground. In this position the vehicle may be moved in any desired manner to any suitable location for work. When the vehicle is positioned to work, the oil cylinder is actuated to extend the rod 25. This will force the jaw 21 downwardly until the base of the fork contacts crank 12, to force the latter into the ground engaging position with the pan 11 thereupon. This positioning of the pan upon the ground raises the end of the vehicle off the ground. In this position the crane may be operated to drag a timber or log up to the vehicle. When the log is in position in front of the vehicle, the jack may be operated to retract the rod 25 and to open the jaws 21, 12 of the tong or clamp. The crane then picks up the log or timber and places it upon the pan 11 after which the upper jaw 21 is then re-actuated to clamp the log against the lower jaw 12 and pan 11 to hold it securely in place. It is to be understood that a similar clamping device is arranged at the opposite corner of the vehicle, and also that the timber extends to both sides of the vehicle as far as possible. On an ordinary vehicle of this type which is perhaps 8 ft. wide, a 40 ft. timber is often used. A timber of this size gives a great amount of bearing surface and a great deal of stability to the vehicle. Also a bearing surface of this size prevents the vehicle from sinking into soft mud or loam since the log and the pan 11, prongs 12 being sunk into the dirt, act as stops to prevent movement of the vehicle.

As soon as one end of the vehicle has been lifted off its wheels a similar process may be carried out on the other end of the vehicle with a similar device, so that both ends of the vehicle will be lifted off the ground and have provided for them a firm and solid support. It is also evident that if any kind of vehicle is to be moved but a short distance that the jacks may be operated to retract the upper jaw a sufficient distance to raise the lower jaw and the log carried thereby on the pan also from the ground. This will allow the vehicle then to be moved in the usual manner. Of course this is not possible if there are any obstructions in the way of timber 20, which would require removal of the timber and carrying it alongside of the vehicle or the provision of a new timber.

While I have shown and described particular embodiments of my invention, it will occur to those skilled in the art that various changes and modifications may be made without departing from the invention, and I, therefore, aim in the appended claims to cover all such changes and modifications as fall within the true spirit and scope of my invention.

Having thus described my invention, I claim:

1. In a vehicle: forming the lower jaw of a clamp, a group engaging means carried by and movable relative to said vehicle and extending downwardly therefrom; means for limiting the downward movement of said ground engaging means; an upper jaw for said clamp; and actuating means for said upper jaw to clamp upon said ground engaging means a timber and to force said ground engaging means upon said limiting means.

2. In a vehicle having a frame, a jack, comprising: a clamp having opposed lower ground engaging and upper actuating jaws, movable relative to the vehicle frame, stop means limiting the motion of the lower jaw with respect to the vehicle frame, and actuating means for moving the upper jaw toward the lower jaw and to clamp an object that may be disposed between said jaws and to force said lower jaw against the ground, to raise said vehicle off the ground, and to move said lower jaw against said stop means.

3. In a vehicle, ground engaging means, comprising: a clamp across the vehicle to engage a timber, and actuator means for closing said clamp and for forcing such a timber against the ground.

4. In a vehicle having a frame, a jack, comprising: a ground engaging member pivotally coupled to said frame, actuating means for swinging said member against the ground to raise said vehicle, said ground engaging member having a jaw portion, and a second jaw in opposed relation and movable toward the jaw portion of the ground engaging member, said actuator means being operable to first move said second jaw and then said first jaw.

5. In a vehicle having a frame, a ground engaging means, comprising: a clamp swingably mounted on said frame across said vehicle to engage a timber, and actuator means for closing said clamp and for forcing such a timber against the ground in support of said frame.

RHEA V. BAKER.